United States Patent
Koike et al.

[11] Patent Number: 5,867,315
[45] Date of Patent: Feb. 2, 1999

[54] CRYSTAL OPTIC LENS AND AN OPTICAL SYSTEM FOR AN OPTICAL PICKUP DEVICE

[75] Inventors: Katsuhiro Koike; Yoshiyuki Tsukai, both of Tsurugashima, Japan

[73] Assignee: Pioneer Electronic Corporation, Tokyo, Japan

[21] Appl. No.: 689,158

[22] Filed: Jul. 30, 1996

[30] Foreign Application Priority Data

Jul. 31, 1995 [JP] Japan ................................ 7-195628

[51] Int. Cl.$^6$ ........................................ G02B 5/30
[52] U.S. Cl. ...................... 359/495; 359/497; 359/501
[58] Field of Search ................................. 359/489, 494, 359/719, 721, 738, 739, 740, 495, 497, 501

[56] References Cited

U.S. PATENT DOCUMENTS

| | | | |
|---|---|---|---|
| 3,990,798 | 11/1976 | White | 359/494 |
| 4,534,649 | 8/1985 | Downs | 356/359 |
| 4,566,762 | 1/1986 | Kato | 359/487 |
| 5,142,411 | 8/1992 | Fiala | 359/494 |
| 5,410,375 | 4/1995 | Fiala | 359/494 |

*Primary Examiner*—Cassandra C. Spyrou
*Assistant Examiner*—John Juba, Jr.
*Attorney, Agent, or Firm*—Finnegan, Henderson, Farabow, Garrett & Dunner, L.L.P.

[57] ABSTRACT

A bifocal crystal optic lens made of a uniaxial crystal comprising two surfaces having a same axis, at least one of the two surfaces being a spherical surface or an aspherical surface. An optical system for an optical pickup device includes; a crystal optic lens consisting of a first lens body made of a transparent uniaxial crystal and a second lens body made of a transparent optical material selected from a second uniaxial crystal and an optical isotropic material, the first and second lens bodies joining via a spherically or aspherically curved interface; and an objective lens aligned with the crystal optic lens in a same optical axis of an incident ray. This optical system for the optical pickup device is capable of making simultaneously two focal points in the same axis, so as to simplify preferably the structure of the compatible video optical disc player for CD and SD to minimize the size thereof, thereby providing a relatively low cost for the manufacture thereof.

29 Claims, 9 Drawing Sheets

$ng = ne \qquad no > ne$ $no < ne \qquad ng = no$

CRYSTAL OPTIC LENS AND AN OPTICAL SYSTEM FOR AN OPTICAL PICKUP DEVICE

BACKGROUND OF THE INVENTION

1. Field of the Invention

The present invention relates to a polarizing optical element, and particularly to an optical pickup system or lens system used in an optical data reading device.

2. Description of the Related Art

There is a demand for a bifocal lens having two different focal lengths usable for an optical pickup system or lens system in an optical data reading device such as a compatible video optical disc player and the like which can read data from a so-called CD (compact disc), SD (super density disc) and the like. It is convenient to play such optical discs of CD, SD and the like which are formed on the basis of different specifications such as various different optical disc thickness by only a single player device. In case of reproduction of data from the optical disc with a multi-layered structure, the thicknesses of layers to be focused are different in such an optical disc. Therefore layers of the multi-layered disc cause spherical aberrations to the objective lens for reading data. Further, the most suitable numerical aperture NA of a certain objective lens for reading data varies for the different optical discs. The bifocal lens is helpful for solving such problems.

A bifocal hologram lens is known. The hologram lens comprises a circular diffraction grating including concentric circular lands and grooves are having a refractive index distribution allowing for a lens action. The hologram lens can separate an incident light beam into some light beams because of its diffraction.

It is difficult to manufacture the bifocal hologram lens having a high diffraction efficiency. The bifocal hologram lens tends to reduce the light beam intensity practically used for the pickup device. In addition, since the performance of the bifocal hologram lens is dependent on the another incident light beam, the bifocal hologram lens is weak against deviations of another of the incident light beam source. These are drawbacks of the bifocal hologram lens.

SUMMARY OF THE INVENTION

Thus, the present invention has been made to solve such problems in view of the forgoing status. An object of the invention is to provide a bifocal crystal optic lens and an optical system for an optical pickup device using the same being capable of achieving a sufficient light beam intensity practically used for the pickup device. In addition, another object of the invention is to provide a bifocal crystal optic lens having a durability against deviations of wavelength of the incident light beam source.

A bifocal crystal optic lens in a first aspect of the present invention is made of a uniaxial crystal comprising two surfaces having a same axis, at least one of said two surfaces having a curved surface. The bifocal crystal optic lens utilizes birefringence of the uniaxial crystal in which two polarized lights i.e., an extraordinary ray and an ordinary ray have the planes of electric vibrations perpendicular to each other respectively so as to divide an incident light beam into the extraordinary and ordinary rays for obtaining two focal points in the same axis. Therefore, the lens construction is simplified preferably to minimize the size of lens itself, thereby providing a relatively low cost for the manufacture thereof.

A first embodiment of the bifocal crystal optic lens includes said uniaxial crystal having a crystal optic axis perpendicular to an optical axis of an incident ray or light beam. This embodiment preferably provides the extraordinary index deviating in maximum from the ordinary index, thereby providing the largest focal distance between two focal points.

A second embodiment of the bifocal crystal optic lens includes said uniaxial crystal having a crystal optic axis parallel to an optical axis of an incident ray. This embodiment preferably provides a flexibility of setting the separation of the polarized lights corresponding to a distance from the optical axis of an incident ray to the output points on the curved surface.

A third embodiment of the bifocal crystal optic lens includes that said curved surface of the lens is a spherical surface or an aspherical surface. This embodiment preferably provides Gaussian image condition i.e., paraxial ray and focus, or aberration correction. In addition, said curved surface of the bifocal crystal optic lens also includes a cylindrical or elliptical surface lens and the like. The aspherical surface has different radiuses of curvature gradually changed in the lens diameter direction to reduce aberrations.

A fourth embodiment of the bifocal crystal optic lens further comprises an aspherical surface layer made of an optical isotropic material formed on at least one of said two surfaces having the same axis. This bifocal crystal optic lens is formed in such a manner that the aspherical surface layer of a polymerized UV-cured resin or the like is formed at tens micro meter thickness on a lens substrate finished at a submicron meter precision by using a die unit mirror-finished at a submicron meter precision before the polymerization, thereby providing a relatively low cost for the manufacture thereof rather than one piece aspherical surface lens.

A crystal optic lens in a second aspect of the present invention comprises a first lens body made of a transparent uniaxial crystal; and a second lens body made of a transparent optical material joining with said first lens body via a curved interface. The crystal optic lens utilizes birefringence of the uniaxial crystal in which the extraordinary and ordinary rays have the planes of electric vibrations perpendicular to each other respectively so as to preferably divide the incident light beam into the extraordinary and ordinary rays for achieving two lens actions different from each other.

In the fifth embodiment of the crystal optic lens of the second aspect of the present invention, one of said first and second lens bodies has a principal plane whose normal line coincides with an optical axis of an incident ray and, one of said first and second lens bodies has an area of the transverse cross section smaller than that of the transverse cross section of the incident light beam in a wavefront direction of the incident light beam. This fifth embodiment comprises only a partial small lens body, thereby providing preferably a relatively low cost for the manufacture thereof.

In a sixth embodiment of the crystal optic lens, the curved interface is a spherical surface or an aspherical surface and the first and second lens bodies have an entrance surface for the incident light beam and an exit surface for a refracted light beam. The entrance and exit surfaces are selected from a plane surface, a spherical surface an aspherical surface. This embodiment preferably provides Gaussian image condition i.e., paraxial ray and focus, or aberration correction. In addition, said curved surface of the bifocal crystal optic lens also includes a cylindrical or elliptical surface lens and the like.

In the seventh embodiment of the crystal optic lens of the second aspect of the present invention, said entrance surface for the incident light beam and the exit surface for the refracted light beam are plane surfaces parallel to each other. This embodiment can be achieved such that the lens body is formed on one side of a low cost transparent plane substrate, thereby providing preferably a relatively low cost for the manufacture thereof.

In the eighth embodiment of the crystal optic lens comprising a first lens body made of a transparent uniaxial crystal; and a second lens body made of a transparent uniaxial crystal joining with said first lens body via a curved interface. Since said transparent optical material of the second lens body is a second uniaxial crystal, the use of the second uniaxial crystal in this crystal optic lens is capable of using selectively a difference between refractive indexes of the first and second uniaxial crystals with respect to the extraordinary ray and the ordinary ray.

In the ninth embodiment of the crystal optic lens of the second aspect of the present invention, said uniaxial crystal is the same as said second uniaxial crystal.

Therefore, the lens construction is simplified to reduce the cost for the manufacture thereof.

In the tenth embodiment of the crystal optic lens of the second aspect of the present invention, said uniaxial crystal is disposed as different from said second uniaxial crystal, thereby increasing the selection of materials for the crystal optic lens.

In the eleventh embodiment of the crystal optic lens of the second aspect of the present invention, said uniaxial crystal and said second uniaxial crystal have crystal optic axes perpendicular to an optical axis of an incident ray respectively. The settings of the crystal optic axis and the optical axis of an incident ray are simplified preferably.

In the twelfth embodiment of the crystal optic lens of the second aspect of the present invention, the crystal optic axes of said uniaxial crystal and said second uniaxial crystal are deposited as being intersected. The settings of the difference between refractive indexes of the first and second uniaxial crystals with respect to the extraordinary ray and the ordinary ray are simplified preferably.

In the thirteenth embodiment of the crystal optic lens of the second aspect of the present invention, the crystal optic axes of said uniaxial crystal and said second uniaxial crystal are deposited as being a 90 degree angle to one another. This crystal optic lens is capable of obtaining the largest refractive index of the two polarized lights.

In the fourteenth embodiment of the crystal optic lens of the second aspect of the present invention, the crystal optic axes of said uniaxial crystal and said second uniaxial crystal are deposited as intersecting a 45 degree angle to one another. This crystal optic lens is capable of obtaining two polarized lights having quantities nearly equal to each other.

In the fifteenth embodiment of the crystal optic lens of the second aspect of the present invention, said optical material is an optical isotropic material. This crystal optic lens provides preferably a relatively low cost for the manufacture thereof, because the optical isotropic material is probably cheaper than the uniaxial crystal in the market.

In the sixteenth embodiment of the crystal optic lens of the second aspect of the present invention, said optical isotropic material has a refractive index being substantially equal to the extraordinary index or the ordinary index of said uniaxial crystal. This crystal optic lens is capable of converting the parallel incident light beam into a parallel light beam and a convergent or divergent light beam.

In the seventeenth embodiment of the crystal optic lens of the second aspect of the present invention, said optical isotropic material is an optical glass or synthetic resin. This crystal optic lens provides preferably a relatively low cost for the manufacture thereof, because the optical isotropic material is probably cheaper than the uniaxial crystal in the market.

An optical system for an optical pickup device in a third aspect of the present invention comprises an objective lens being a bifocal crystal optic lens made of a uniaxial crystal comprising two surfaces having a same axis, at least one of said two surfaces being a spherical surface or an aspherical surface. This optical system for the optical pickup device causes the structure of a compatible video optical disc player for CD and SD to be simplified preferably to minimize the size of lens itself, thereby providing a relatively low cost for the manufacture thereof.

An optical system for an optical pickup device in a fourth aspect of the present invention comprises; a crystal optic lens comprising; a first lens body made of a transparent uniaxial crystal; and a second lens body made of a transparent optical material selected from a second uniaxial crystal and an optical isotropic material, said first and second lens bodies joining via a spherically or aspherically curved interface; and an objective lens aligned with said crystal optic lens in a same optical axis of an incident ray. This optical system for the optical pickup device is capable of making simultaneously two focal points in the same axis, so as to simplify preferably the structure of the compatible video optical disc player for CD and SD to minimize the size thereof, thereby providing a relatively low cost for the manufacture thereof.

In the eighteenth embodiment of the optical system of the fourth aspect of the present invention, one of said first and second lens bodies has a transverse cross section whose area is less than an area of a transverse cross section of the incident light beam in a wavefront direction of the incident light beam. In this optical system for the optical pickup device, the crystal optic lens play the role of a numerical aperture restricting member. This optical system for the optical pickup device is capable of making simultaneously two focal points in the same axis, so as to simplify preferably the structure of the compatible video optical disc player for CD and SD to minimize the size thereof, thereby providing a relatively low cost for the manufacture thereof.

The nineteenth embodiment of the optical system of the fourth aspect of the present invention further comprises numerical aperture restricting means for restricting a numerical aperture of said crystal optic lens disposed at an incident side thereof. This optical system for the optical pickup device is capable of making simultaneously two focal points in the same axis, so as to simplify preferably the structure of the compatible video optical disc player for CD and SD to minimize the size thereof, thereby providing a relatively low cost for the manufacture thereof. In this case, said numerical aperture restricting means is selected from both an annular polarizing plate disposed in the optical axis of the incident ray and having an opening whose area is less than an area of a transverse cross section of the incident light beam in a wavefront direction of the incident light beam, and a ¼ wavelength plate whose area is less than an area of a transverse cross section of the incident light beam in a wavefront direction of the incident light beam and disposed in the optical axis of the incident ray.

Additional features and advantages of the present invention are described in, and will be apparent from, the detailed description of the presently preferred embodiments.

Figure 1:
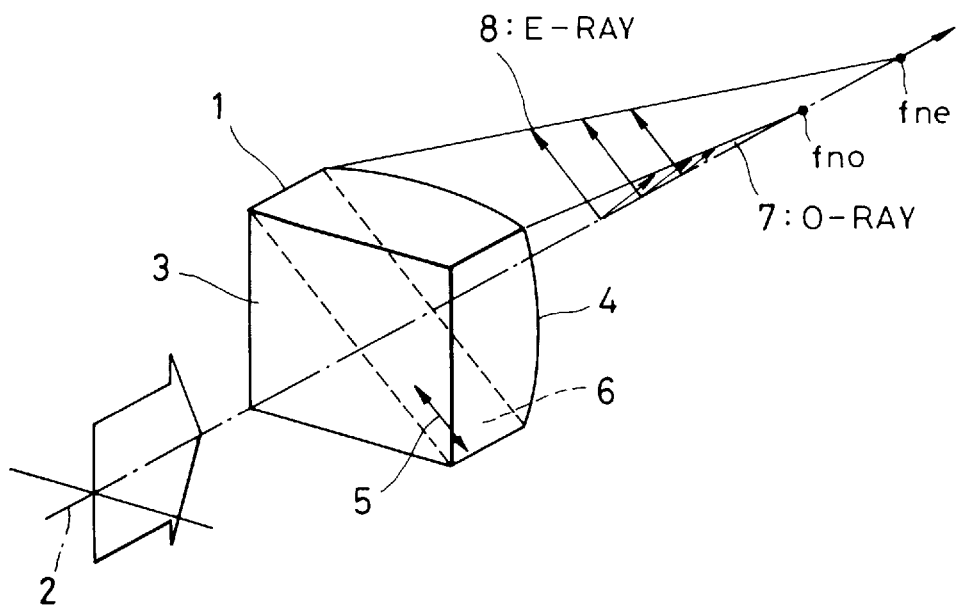
FIG. 1 is a perspective view showing an embodiment of the bifocal crystal optic lens according to the present invention.

DETAILED DESCRIPTION OF THE PREFERRED EMBODIMENTS (Bifocal Crystal Optic Lens)

The embodiment is a bifocal crystal optic lens being made of a uniaxial crystal having two surfaces arranged on the same common axis, at least one of the two surfaces having a spherical surface or an aspherical surface so that the crystal optic axis is perpendicular or parallel to the optical axis of an incident ray. The bifocal crystal optic lens may have an aspherical surface resin layer on at least one of two surfaces having the same axis. The inventors have taken attention to an optical anisotropic material exhibiting birefringence and applied such a double refraction material to an optic lens. The anisotropic material or crystal takes the form of two refractive indexes with respect to two polarized lights perpendicular to each other thereby exhibiting the double refraction or birefringence. Assuming that the component $D_i$ of an electric displacement vector D is represented in an electric field of an anisotropic crystal material as follows;

$$D_i = \Sigma_i \epsilon_{ij} E_{j-\epsilon o}(1+\Sigma_j X_{ij}^{(1)})E_j \tag{A}$$

where $\epsilon_o$ denotes the dielectric constant in vacuum, $E_j$ denotes the electric field vector component, $X_{ij}^{(1)}$ denotes the first order electric susceptibility and $\epsilon_{ij}$ denotes the dielectric tensor.

The behavior of an entering light wave in the anisotropic crystal will be expressed by utilizing the following conditions i.e., its energy U is constant (A2) and (A3). When defining suitable coordinate axes in the crystal, $\epsilon_{ij}$ may be diagonalized.

$$U = E \cdot D = D\Sigma_i\Sigma_j(\epsilon_{ij})^{-1} D_iD_j = \text{constant} \tag{A2}$$

$$div D = \Sigma s_i D_i = 0 \tag{A3}$$

where $s_i$ denotes each component in the light propagating direction.

Assuming $\epsilon_i$ for the diagonalized $\epsilon_{ij}$, $\epsilon_i/\epsilon_o = n_i^2$, the square root of $D_j/\epsilon_o U = x_j$, then the equations (A2) and (A3) may be represented as follows:

$$\frac{x_1^2}{n_1^2} + \frac{x_2^2}{n_2^2} + \frac{x_3^2}{n_3^2} = 1 \tag{A4}$$

$$s_1 x_1 + s_2 x_2 + s_3 x_3 = 0 \tag{A5}$$

The intersection of the refractive index ellipsoid represented by (A4) and the plane surface represented by (A5) is ellipse in general. The entering light wave propagates in the crystal with two refractive indexes corresponding to the length of the principal axis of the refractive index ellipsoid. In other words, the entering light wave propagates as separated two rays linearly polarized in planes orthogonal to each other. In this case, $x_i$ is so called an optical principal axis to form an $x_1 x_2 x_3$ coordinate and $n_i$ is a principal refractive index (subscript i=1, 2 or 3). The anisotropic crystal is classified into the following three crystal classes in the crystal optics.

1) Isometric crystal (cubic), $n_1 = n_2 = n_3$, non-double-refraction

2) Uniaxial crystal (tetragonal, trigonal, hexagonal), $n_1 = n_2 \neq n_3$

3) Biaxial crystal (triclinic, monoclinic, orthorhombic), $n_1 \neq n_2 \neq n_3$ In the uniaxial crystal, the ordinary ray vibrates perpendicular to a plane (principal plane) including the crystal optic axis and the wave front propagating direction. The ordinary ray propagates at a constant refractive index $n_1 = n_2 = n_o$ (the ordinary index regardless of its propagating direction in the crystal. On the other hand, the extraordinary ray vibrates in the principal plane and propagates at the refractive index n ($\theta$) represented by the following equation;

$$\frac{1}{[n(\theta)]^2} = \frac{\cos^2\theta}{n_o^2} + \frac{\sin^2\theta}{n_e^2} \tag{A6}$$

where $\theta$ denotes an angle of the wave front propagating direction to the crystal optic axis and $n_e$ denotes the extraordinary index $n_3$.

The refractive index n ($\theta$) varies within the range of $\theta = 0-90$ degree from $n_o$ (the ordinary index) to $n_e$ (the extraordinary index) in accordance with the propagating direction of the extraordinary ray in the crystal. In other words, the length of radius vector in the section of the refractive index ellipsoid including the crystal optic axis exhibits the extraordinary index. When $\theta = 0$, n ($\theta$) = $n_o$.

Therefore, the uniaxial crystal has only one crystal optic axis. Crystals having $n_e > n_o$ such as quartz or the like are called positive crystals, and crystals having $n_o > n_e$ such as Calcite or the like are called negative crystals.

It is therefore found that the bifocal crystal optic lens of the uniaxial crystal having the crystal optic axis non-parallel to the optical axis of an incident ray separates the incident ray into two polarized lights having the planes of vibration orthogonal to each other i.e., the extraordinary ray and the ordinary ray. Particularly, the bifocal crystal optic lens made of the uniaxial crystal having the crystal optic axis perpendicular to the optical axis of an incident ray can separate the incident ray into two polarized lights at the largest angle of deflection.

A bifocal crystal optic lens for example, a single lens comprising two spherical surfaces will be designed by the following imagery equation in Gaussian region.

$$\frac{1}{f} = (n-1)\left(\frac{1}{r_1} - \frac{1}{r_2}\right) + \frac{(n-1)^2}{n} \frac{d}{r_1 r_2}$$

where f denotes the focal distance, n denotes refractive index of the lens including $n_o$ or $n_e$, $r_1$ and $r_2$ denote radiuses of curvature of the two spherical surfaces and d denotes the lens thickness.

Assuming that the bifocal crystal optic lens is a plano-convex lens i.e., $r_2$=infinite, the above equation leads to the following equation.

$$f(n-1) = r_1$$

It is found by this equation that the focal distance changes correspondingly to the variation of refractive index of the polarized light, particularly the extraordinary ray. Therefore, the distance between the two focal points of the bifocal crystal optic lens can be defined by selecting the crystal optic axis of the uniaxial crystal with respect to the optical axis of an incident ray.

In addition, the bifocal crystal optic lens may be formed as having the angle θ=0 of the optical axis of the crystal optic axis of the uniaxial crystal to an incident ray i.e., the optical axis being parallel to the incident ray. In this case, such a bifocal crystal optic lens can gradually separate the extraordinary ray as going away from the optical axis of an incident ray $n(θ) = n_o$.

In addition to a spherical surface, the curved surface of the bifocal crystal optic lens includes an aspherical surface for correcting aberration of the lens and the directions of the two separate polarized lights. Moreover, to amend the polarized light splitting direction and the aberration correction, the bifocal crystal optic lens may have an aspherical surface resin layer on at least one of the two surfaces having the same axis.

Further, instead of the uniaxial crystal, the bifocal crystal optic lens or the optical element may be formed of the biaxial crystal. In the case that two rays linearly polarized in planes orthogonal to each other propagate in the biaxial crystal, assuming that two rays propagate in the propagating direction angles θ, Φ to the optical principal axes $X_3$, $x_1$, the refractive index n with respect of these two polarized light is represented by the following quadratic equation:

$$\frac{\sin^2\theta\cos^2\phi}{n^{-2} - n_1^{-2}} + \frac{\sin^2\theta\sin^2\phi}{n^{-2} - n_2^{-2}} + \frac{\cos^2\phi}{n^{-2} - n_3^{-2}} = 0 \quad (A7)$$

This equation gives two solutions. There are two directions that these two solutions coincide to each other. Therefore, the bifocal crystal optic lens or the optical element may be formed by selecting the directions of two crystal optic axes.

The following Table 1 shows examples of the uniaxial crystals.

TABLE 1

| Uniaxial crystal | Ordinary index | Extraordinary index |
|---|---|---|
| Quartz (wavelength: 780 nm) | 1.539 | 1.548 |
| Quartz (wavelength: 650 nm) | 1.542 | 1.551 |
| LiNbO$_3$ (wavelength: 650 nm) | 2.282 | 2.199 |
| Wurtzite (ZnS) | 2.356 | 2.378 |
| Rutil (TiO$_2$) | 2.616 | 2.903 |
| Hematite (Fe$_2$O$_3$) (wavelength 670.8 nm) | 2.940 | 3.220 |
| Cadmium sulfide | 2.506 | 2.529 |
| Calcite | 1.684 | 1.486 |
| Corundum (sapphire, Al$_2$O$_3$) | 1.768 | 1.760 |
| Soda-niter (NaNO$_3$) | 1.5854 | 1.3369 |
| Tourmaline | 1.669 | 1.638 |
| Potassium dihydrogenphosphate (KDP) | 1.5095 | 1.4684 |
| Ammonium dihydrogenphosphate (ADP) | 1.5242 | 1.4787 |

FIG. 1 shows a perspective view of an example of a bifocal crystal optic lens 1 of a single lens that is made of a uniaxial crystal. This lens is disposed on the optical axis of an incident ray 2 in the air through which an incident light beam passes. This lens has an entrance surface 3 for the incident light beam and an exit surface 4 for the refracted light beam. These two surfaces are disposed in the same axis i.e., the optical axis of the incident ray 2. This uniaxial crystal is the negative crystal $n_o > n_e$ such as Calcite and the like. The entrance surface 3 is a plane surface and the exit surface 4 is a spherical surface. The crystal optic axis of the uniaxial crystal 5 is perpendicular to the optical axis of an incident ray 2. When a linearly polarized light is irradiated through the entrance surface 3 into the lens, it is separated into an ordinary ray 7 (O-ray) having the plane of vibration perpendicular to the principal plane 6 of the uniaxial crystal and an extraordinary ray 8 (E-ray) having the plane of vibration parallel to the principal plane 6 of the uniaxial crystal. The exit surface 4 of the lens converges O-ray and E-ray onto the ordinary ray focal point fno and the extraordinary ray focal point fne respectively. In case that the positive uniaxial crystal $n_e > n_o$ such as quartz and the like is used for the lens, the focal points fno and fne are in reverse order on the optical axis 2.

In addition to the perpendicular arrangement of the crystal optic axis of the uniaxial crystal 5 to the optical axis of an incident ray 2, the crystal optic axis of the uniaxial crystal may be disposed as non-parallel or inclined to the optical axis of an incident ray, or parallel to the optical axis of an incident ray. Both the surfaces having the same optical axis 3, 4 may be formed as including at least one spherical surface or aspherical surface. In addition, the bifocal crystal optic lens may comprise an aspherical surface resin layer on at least one of the surfaces having the same optical axis.

(Crystal Optic Lens)

Figure 2:
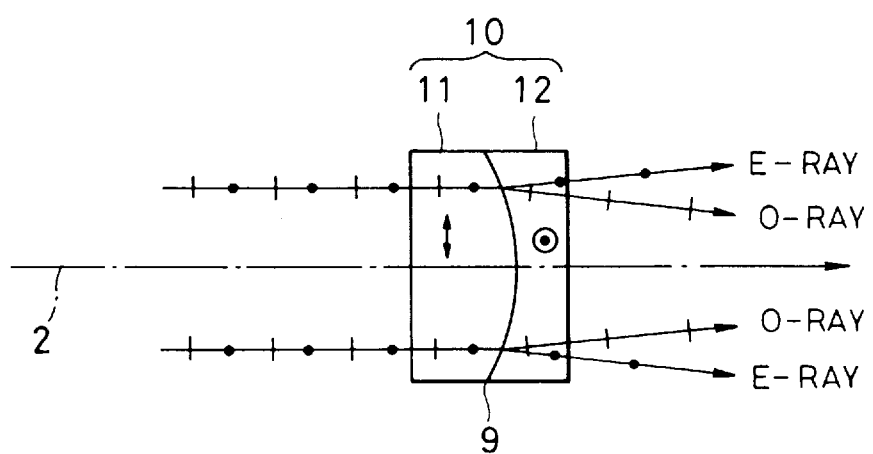
FIG. 2 is a cross-sectional view showing an embodiment of the crystal optic lens according to the present invention.

Next, FIG. 2 shows a sectional view of a second example of a crystal optic lens 10 of a planar compound lens comprising a first convex lens body 11 made of a transparent negative uniaxial crystal disposed on the side of the incident light and a second concave lens body 12 made of the same uniaxial crystal disposed on the side of the output light. The first convex lens body 11 is combined via a curved interface 9 to the second concave lens body 12. The curved interface 9 is a spherical surface or an aspherical surface. In the crystal optic lens 10, each crystal optic axis of the uniaxial crystal is perpendicular to the optical axis of an incident ray 2. The first convex lens body 11 and the second concave lens body 12 are adhesived in such a manner that the crystal optic axes of the convex and concave lenses are perpendicular to each other. Since the planar compound lens 10 is made of the negative uniaxial crystal $n_o > n_e$, it acts as a convex lens or concave lens in accordance with the electric vibration of the incident light beam passing through the convex lens body 11.

In this way, the crystal optic lens of the present invention is the compound lens comprising a first lens body made of a transparent uniaxial crystal disposed on the side of the incident light; and a second lens body made of a transparent optical material including the transparent uniaxial crystal disposed on the side of the output light and joining with the first lens body via the curved interface. Instead of the same uniaxial crystal for the second and first lens bodies, different uniaxial crystals may be selected and used for the second and first lens bodies.

Figure 3:
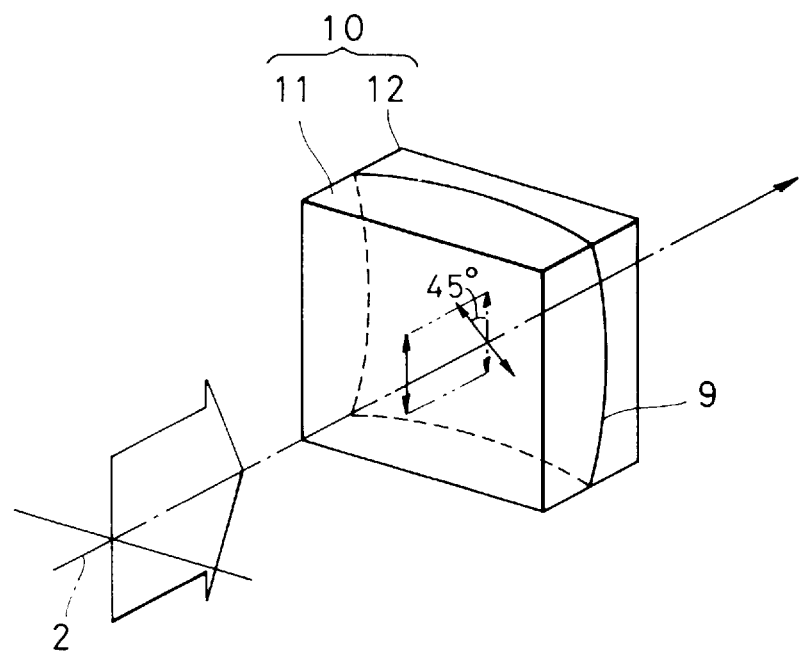
FIG. 3 is a perspective view showing another embodiment of the crystal optic lens according to the present invention.
Figure 4:
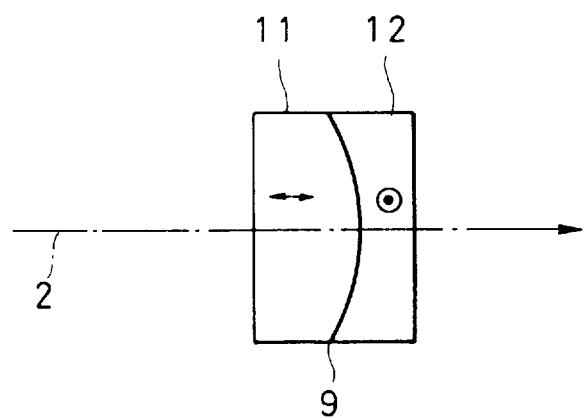
FIG. 4 is a cross-sectional view showing another embodiment of the crystal optic lens according to the present invention.

In addition, as shown in FIG. 3, the crystal optic lens 10 of another example of a planar compound lens having the curved interface 9 may comprise the first convex lens body 11 of the uniaxial crystal and the second concave lens body 12 of the second uniaxial crystal which are adhesived in such a manner that the crystal optic axes (double pointed arrows) of the convex and concave lenses are inclined or crossed at a 45 degree angle to each other. Furthermore, as shown in FIG. 4 similarly to the above compound bifocal crystal optic lens, the crystal optic lens 10 of another example of a planar compound lens having the curved interface 9 may be formed in such a manner that the crystal optic axes of the uniaxial crystal 11 and the second uniaxial crystal 12 are perpendicular to each other while the crystal optic axis (a double pointed arrow) of the uniaxial crystal 11 is parallel to the optical axis 2 and vice versa, though the example of FIG. 2 provides the crystal optic axis of the uniaxial crystal 11 is perpendicular to the optical axis 2. In this way, the crystal optic lens of compound type is generally a flat plate lens so that the entrance surface for the incident light beam and the exit surface for the refracted light beam are parallel to each other. In addition, the entrance and/or exit surface of the crystal optic lens is selected from a plane surface, a spherical surface or an aspherical surface.

Figure 5:
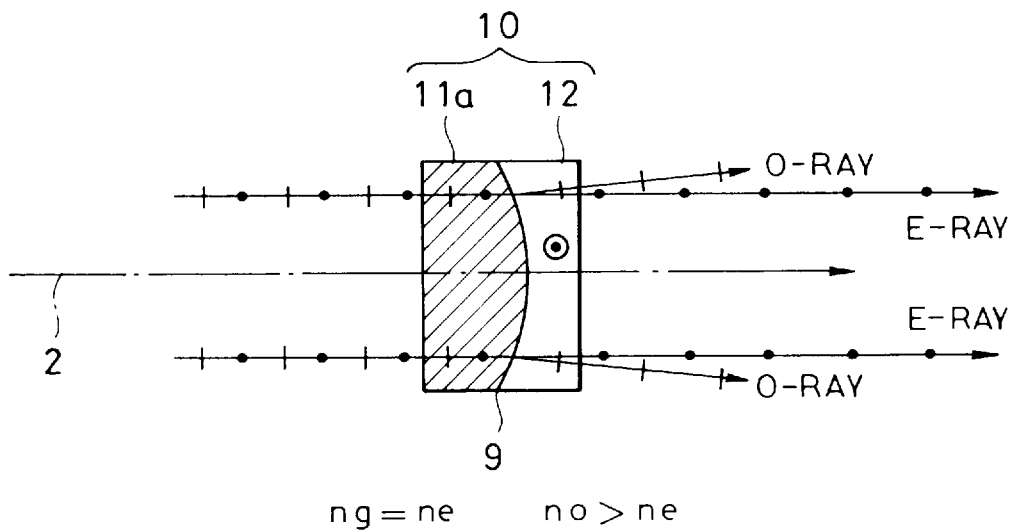
FIG. 5 is a cross-sectional view showing another embodiment of the crystal optic lens according to the present invention.

In addition, in the third embodiment of the crystal optic lens, one of the first and the second lens bodies is formed of an optical isotropic material such as an optical glass, a synthetic resin and the like instead of the uniaxial crystal. As shown in FIG. 5, the crystal optic lens 10 is substantially the same as one of FIG. 2 except for the first convex lens body. In this lens, the convex lens 11a of the first convex lens body is made of an optical isotropic material of an optical glass ( whose refractive index=$n_g$=$n_e$).

This crystal optic lens 10 with the curved interface 9 including the convex glass lens 11a and the second uniaxial crystal lens 12 acts as a plane parallel plate with respect to the extraordinary ray without any lens action ($n_g$=$n_e$). On the other hand, with respect to the ordinary ray, This crystal optic lens 10 acts as a concave lens because of the second uniaxial crystal lens 12 made of negative uniaxial crystal $n_o > n_e$. In this way, a flexibility of setting the lens actions according to polarization of the incident light beam is achieved by using the optic crystal for a compound lens. As similar to the above embodiment, the crystal optic axis of the second uniaxial crystal lens 12 may be disposed parallel or inclined to the optical axis of an incident ray so as to obtain different lens actions. In addition to the crystal plate lens with parallel plane surfaces, the entrance and/or exit surface of the crystal optic lens may be selected from a plane surface, a spherical surface or an aspherical surface.

Figure 6:
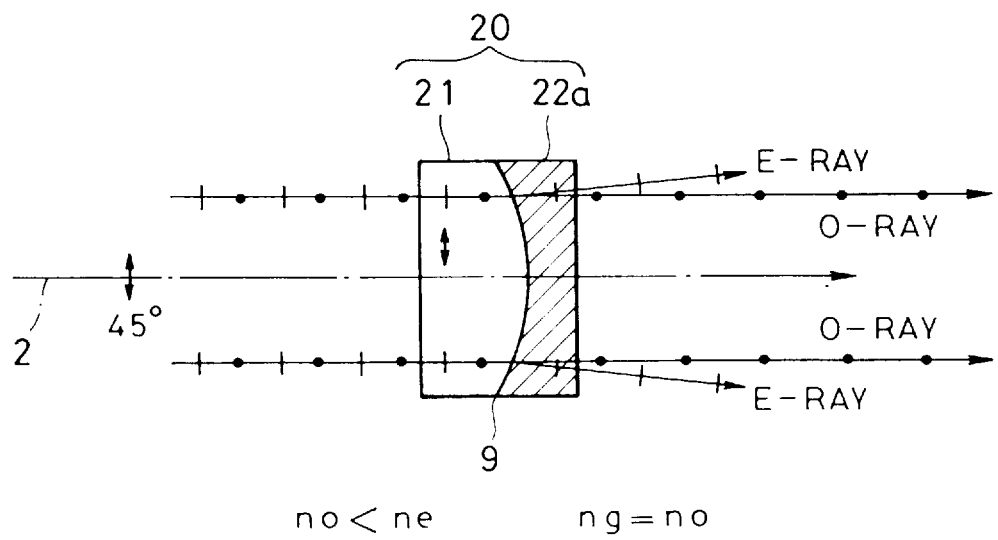
FIG. 6 is a cross-sectional view showing another embodiment of the crystal optic lens according to the present invention.

In contrast to the crystal optic lens of FIG. 5, FIG. 6 shows another embodiment of adhesion type, in which the first convex lens body 21 is made of the positive uniaxial crystal ($n_o < n_e$) such as quartz and the like having a relatively low refractive index whose crystal optic axis is perpendicular to the optical axis 2 of the incident light beam. The second concave lens body 22a is made of an optical glass (refractive index=$n_g$=$n_o$). In this way, the crystal optic lens 20 comprises the first convex lens body 21 and the second lens body made of a transparent optical glass material joining with the first lens body via the spherical interface 9. In this case, to the first convex lens body 21 a linearly polarized light is irradiated as the incident light ray whose the plane of vibration is inclined at a 45 degree angle to the crystal optic axis of the convex lens body 21.

When irradiating the 45 degree angle inclined linearly polarized light to the crystal optic axis, the crystal optic lens 20 separates the ordinary ray of linearly polarized light and the extraordinary ray of linearly polarized light because of the double refraction of the first convex lens body 21 of quartz. The 0-ray entering the spherical interface 9 passes through the second concave lens body 22a due to $n_g$=$n_o$, as passing a plane parallel plate. On the other hand, the E-ray entering the spherical interface 9 is refracted due to $n_g$=$n_o$<$n_e$, as passing a concave lens.

Figure 7:
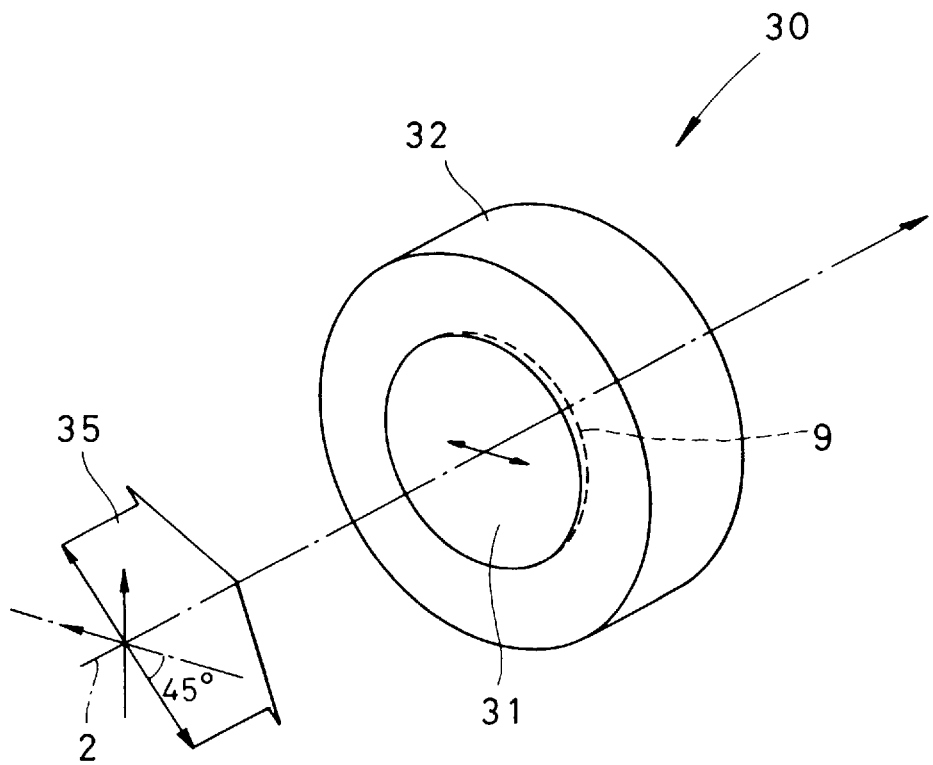
FIG. 7 is a perspective view showing another embodiment of the crystal optic lens according to the present invention.
Figure 8:
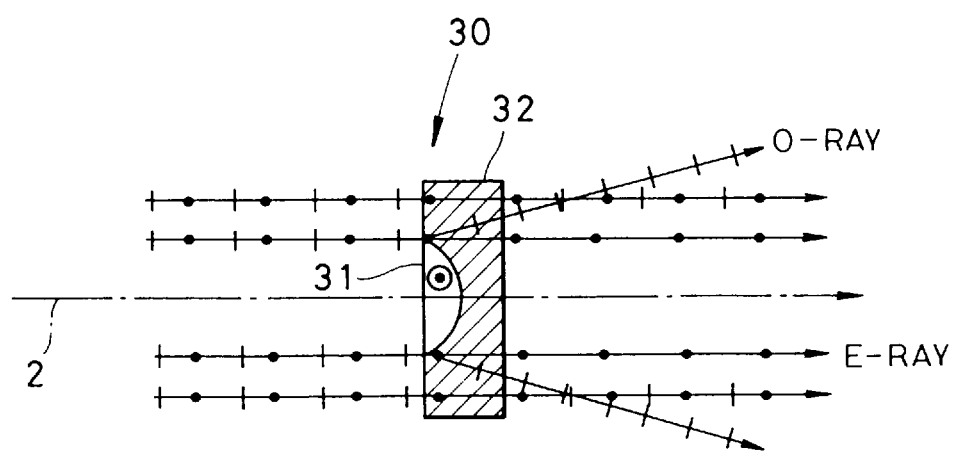
FIG. 8 is a cross-sectional view showing another embodiment of the crystal optic lens according to the present invention.

In addition, FIG. 7 show a fourth embodiment in which a crystal optic lens 30 plane parallel plate type comprises a first convex lens body 31 made of a negative uniaxial crystal and a second concave lens body 32 made of a transparent optical glass (refractive index=$n_g$=$n_o$) joining with the first lens body via a spherical interface 9. The circular first lens body 31 is disposed at the center of the circular second lens body 32 on the optical axis of an incident ray 2. The area of the transverse cross section of the first lens body 31 is smaller than the area of the transverse cross section of the second concave lens body 32. In addition, when irradiating largely the incident light beam to the crystal optic lens 30, such an area of the first lens body 31 has an area of the transverse cross section smaller than that of the transverse cross section of the incident light beam in a wavefront direction of the incident light beam. In this case, a linearly polarized light having the plane of vibration 35 inclined at a 45 degree angle to the crystal optic axis is irradiated to the convex lens body 31, and then is separated into two components of the ordinary ray and the extraordinary ray. As shown in FIG. 8, the ordinary ray component (whose electric vector vibrates perpendicular to the plan of the figure as shown in crossbars on the horizontal arrows) straightly passes through the peripheral portion of the second concave lens body 32 of the optical element 30. At the central portion of the optical element 30 i.e., the first lens body 31, the ordinary ray also passes straightly through the crystal optic lens 30 as passing a merely plane parallel glass plate because the indexes of the first and second lens bodies 31, 32 are equal to each other ($n_o$=$n_g$) with respect to the ordinary ray. On the other hand, the extraordinary ray component (whose electric vector vibrates parallel to the plane of the figure as shown in dots on the horizontal arrows) diverges at the central portion of the optical element 30 ($n_e$<$n_g$) although passing through the peripheral portion of the second concave lens body 32, as shown in FIG. 8. In this way, the crystal optic lens 30 acts as a concave lens with respect to the extraordinary ray.

Figure 9:
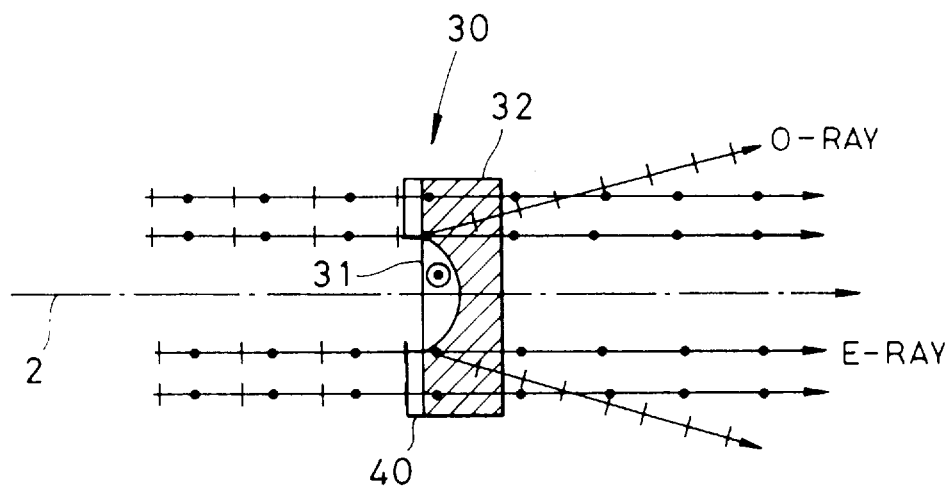
FIG. 9 is a cross-sectional view showing another embodiment of the crystal optic lens according to the present invention.

In addition to the fourth embodiment, as shown in FIG. 9, the crystal optic lens 30 at the side of the incident ray may be provided with an annular polarizing plate 40 with an opening which allows the total polarized light components of the incident light beam to directly enter the first lens body, when it is necessary to vary the quantities of the extraordinary and ordinary ray components. The annular polarizing plate 40 allows the ordinary ray to pass per se and thus the extraordinary ray component is intercepted at the central portion by the first lens body 31 and the extraordinary ray is restricted in the peripheral portion of the second concave lens body.

Figure 10:
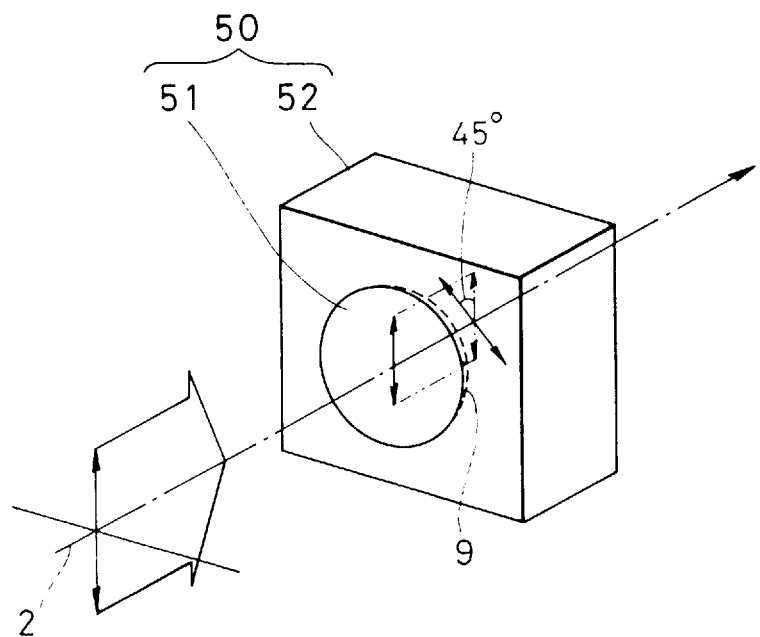
FIG. 10 is a perspective view showing another embodiment of the crystal optic lens according to the present invention.
Figure 11:
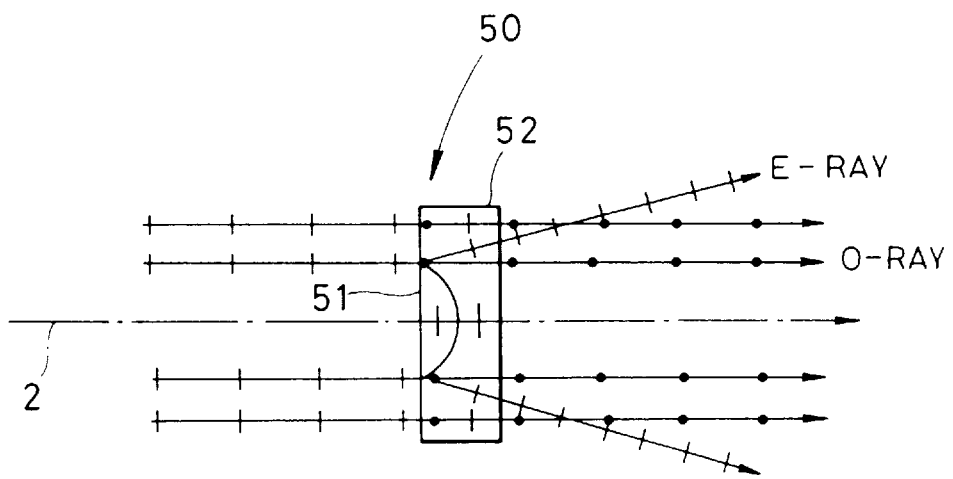
FIG. 11 is a cross-sectional view showing another embodiment of the crystal optic lens according to the present invention.

This fourth embodiment provides a structure of the crystal optic lens that the first lens body implanted into the second lens body. This structure may be applied to a crystal optic lens comprising the first and the second lens bodies made of a crystal having a comparatively high refractive index such as $LiNbO_3$ and the like. For example, as shown in FIG. 10, a crystal optic lens 50 is formed in such a manner that a first convex lens body 51 made of $LiNbO_3$ is implanted into a second concave lens body 52 made of $LiNbO_3$ so that the crystal optic axis (a double pointed arrow) of the second concave lens body 52 is inclined at a 45 degree angle to the crystal optic axis of the first convex lens body 51. The crystal optic lens 50 allows incident light at the peripheral portion to pass through itself, as shown in FIG. 11, and acts as a transparent plane parallel plate. The incident light at the central portion of the crystal optic lens 50 passes through the curved interface 9 and is separated into the ordinary ray of linearly polarized light and the extraordinary ray of linearly polarized light. The ordinary ray straightly passes through the crystal optic lens 50, but the extraordinary ray is refracted. In this way, the crystal optic lens of compound lens type consisting of first and second lens bodies of uniaxial crystals is formed in such a manner that the crystal optic axes of the first and second uniaxial crystals are perpendicular to the optical axis of an incident ray respectively the are deposited at a 45 degree angle to one another.

These embodiments of crystal optic lenses having two different lens functions are usable and useful for the optical pickup system or lens system in the optical data reading device such as a compatible video optical disc player. Such a compatible video optical disc player including the crystal optic lens can read data from CD, SD and the like formed with different specifications, even though a spherical aberration exists in each layer in case of reproduction of data from an optical disc with a multi-layered structure. Further, such a compatible player can read data from the disc, even though the most suitable numerical aperture NA of a certain objective lens for reading data differs from that of another in the different optical discs. Accordingly, the above mentioned polarizing optical element of the crystal optic lens is very efficient to the optical pickup system.

(Optical System for an Optical Pickup Device)

There are differences between two optic systems used for the optical pickup systems for reading data from CD and SD.

(1) Numerical aperture NA. (SD: NA=0.6 vs. CD: NA=0.37)

(2) Thickness of optical disc. (SD: thickness=0.6 mm vs. CD: thickness=1.2 mm)

Thus, the optical pickup device of a compatible video optical disc player for CD/SD requires a switching system for absorbing the above differences. The differences in the optical disc thickness and the NA are dealt by the selections of the uniaxial crystal material and the optical isotropic material for the crystal optic lens and the designing of the curvatures of the interface and the spherical surface as well as the correction of the curved surface in the lens bodies.

For example, the crystal optic lens 30 of the fourth embodiment shown in FIG. 9 is usable for a polarizing optical element. As shown in FIG. 12, an optical system for an optical pickup device for the optical discs with different specifications in both the optical disc thickness and a suitable NA of the objective lens. In this optical system for the optical pickup device, the objective lens 90 is disposed in the optical downstream of the crystal optic lens 30. In addition, the optical disc 60 or 70 is disposed in the optical downstream of the objective lens 90. The optical system includes a focus servo mechanism for varying the distance wd between the objective lens 90 and the optical disc 60 or 70 while keeping constant the distance between the crystal optic lens 30 and the objective lens 90.

This optical system for the optical pickup device can read data from the optical discs i.e., the SD 70 of a thickness 0.6 mm with NA=0.6 or the CD 60 of a thickness 1.2 mm with NA=0.37 under the conditions that the distance between the crystal optic lens 40 and the objective lens 90 is constant.

In case of the reproduction of SD, the crystal optic lens 30 acts as a transparent plane parallel plate by using the ordinary ray. The focus servo mechanism adjusts the distance wd between the objective lens 90 and the optical disc 70 to focus the ordinary ray on the recording medium of the optical disc.

Figure 12A:
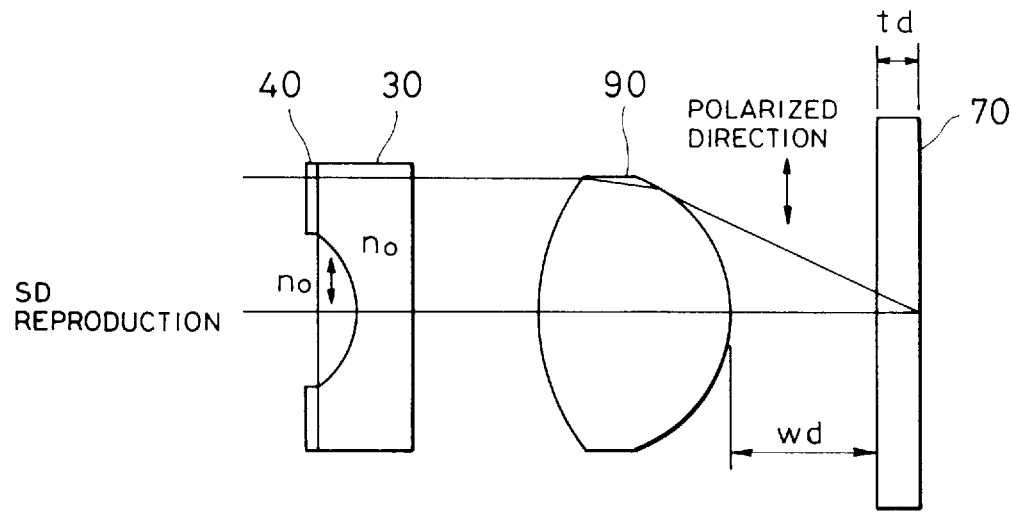
FIGS. 12A and 12B are cross-sectional views each showing an embodiment of an optical system for an optical pickup device in different forms according to the present invention.

In case of the reproduction of CD, the crystal optic lens 30 acts as a concave lens by using the extraordinary ray. It is necessary to vary the NA for the thickness of CD. Since the crystal optic lens 30 through which the extraordinary ray passes is provided with the polarizing plate 40 disposed peripherally at the first convex lens body 31, the combination of the crystal optic lens 30 and the polarizing plate 40 can act as thinning the light beam to reduce the efficient NA, as shown in FIG. 12A. The light beam irradiated to the second lens body region having a circle area with the radius r or more from the optical axis is intercepted by the polarizing plate 40. However, the particular light beam entering the first lens body region with the section of radius r or less from the optical axis is subjected to the concave lens action, since the polarizing plate 40 is provided with the opening with the radius r which allows the selected polarized light components of the incident light beam to enter the first lens body.

When reading data from an SD having two recording layer structure, such an optical system for an optical pickup device can converge two polarized lights onto the two recording layers of the SD respectively.

In addition to the crystal optic lens comprising the first lens body of the uniaxial crystal and the second lens body of the optical glass, it is apparent that the use of the crystal optic lens comprising the first lens body of the uniaxial crystal and the second lens body of the uniaxial crystal as shown in FIG. 10 causes a similar optical system for an optical pickup device. In this case, a spherical aberration occurs due to the difference of the optical disc thickness, but it may be removed by varying the distance between the object point and the image point. If there is a large variation of the optical disc thickness, which probably brings a spherical aberration, the spherical interface between the first and second lens bodies of the above polarizing optical element is modified to be an aspherical surface so that the spherical aberration is reduced.

In this way, an optical system for an optical pickup device according to the present invention includes the crystal optic lens comprising the first lens body of the transparent uniaxial crystal disposed on the side of the incident light and the second lens body of the transparent uniaxial crystal or isotropic optical material disposed on the side of the output light. The first lens body joins with the first lens body via the curved interface. Under the conditions that the normal line of the principal plane of the crystal optic lens coincides to the optical axis of an incident ray, it is necessary that the area of the transverse cross section of the first lens body is smaller than the area of the transverse cross section of the incident light beam so that the incident light beam is directly irradiated to the first lens body.

In another embodiment, instead of the optical system for an optical pickup device as shown in FIG. 12 including the crystal optic lens comprising the implanted first lens body with a small area in the transverse cross section, the above third embodiment of the adhesion type crystal optic lens is used for the optical system. In this case, the NA correction is achieved by providing the numerical aperture restricting means for thinning the incident light beam in the reproduction of SD which is disposed at the optical upstream of the crystal optic lens. The optical pickup device for compatible video optical disc player for CD/SD is obtained by providing the polarizing plate 40 placed at the side of the incident light of the crystal optic lens as shown in FIG. 9 in the optical system for an optical pickup device of FIGS. 13A and 13B.

Figure 13A:
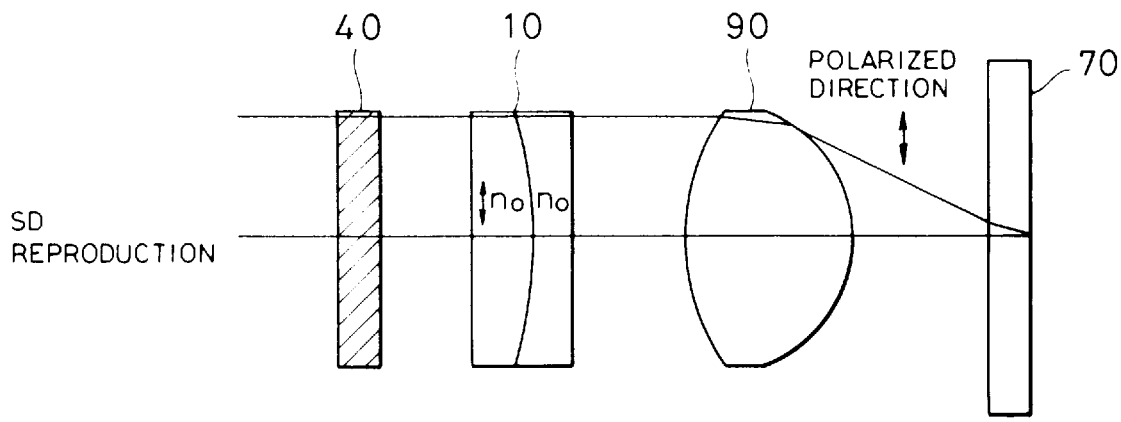
FIGS. 13A and 13B are cross-sectional views each showing another embodiment of an optical system for an optical pickup device in different forms according to the present invention and FIG. 13C shows a plan view of an annular polarizing plate used for the same.
Figure 13B:
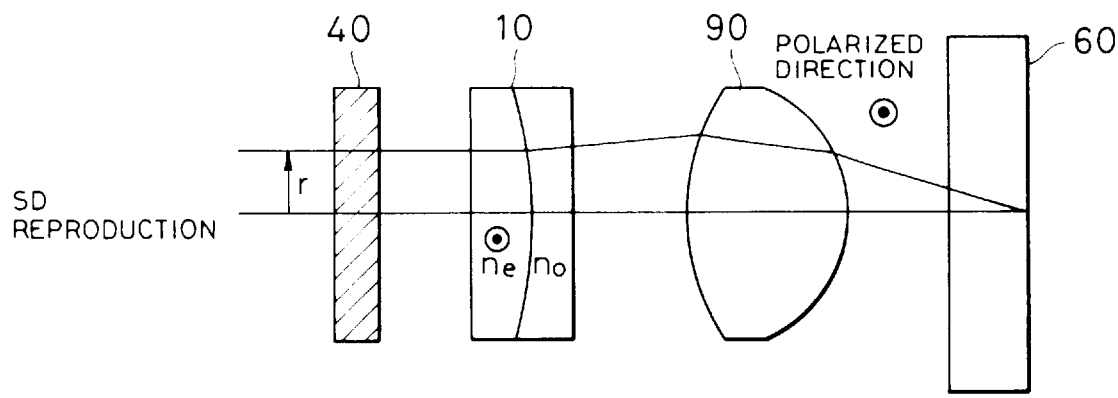
Figure 13C:
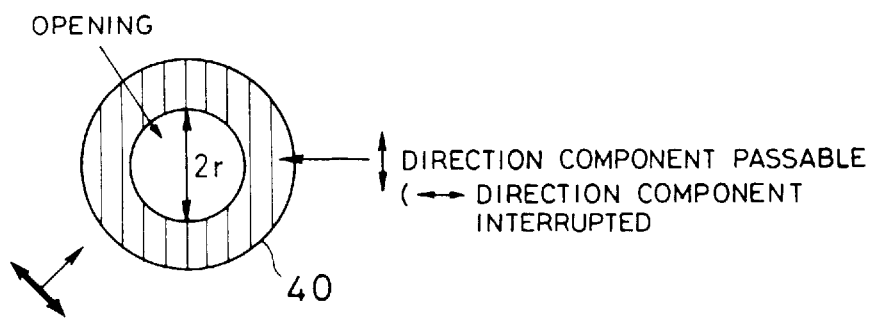
Figure 14A:
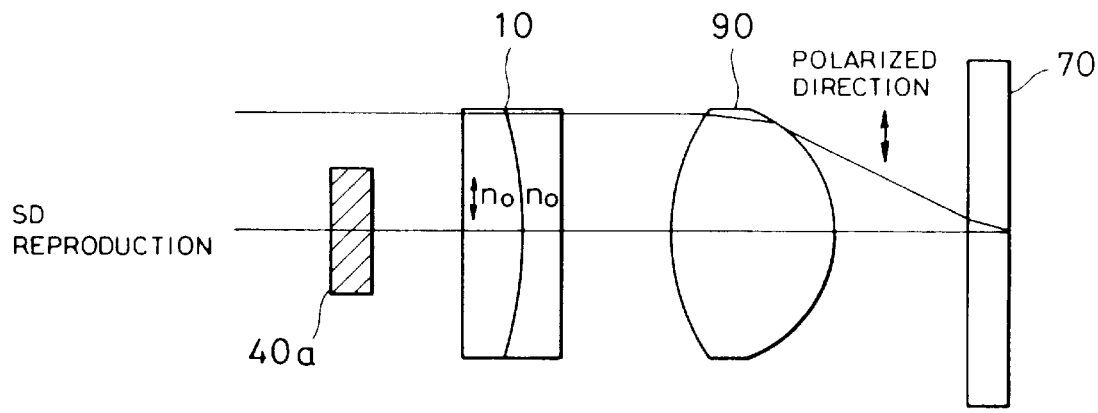
FIGS. 14A and 14B are cross-sectional views each showing another embodiment of an optical system for an optical pickup device according to the present invention and FIG. 14C shows a plan view of an annular ¼ wavelength plate used for the same.
Figure 14B:
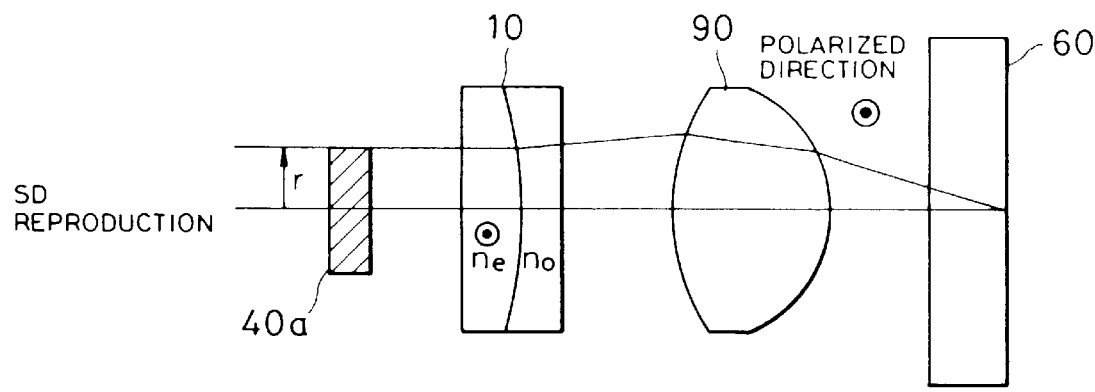
Figure 14C:
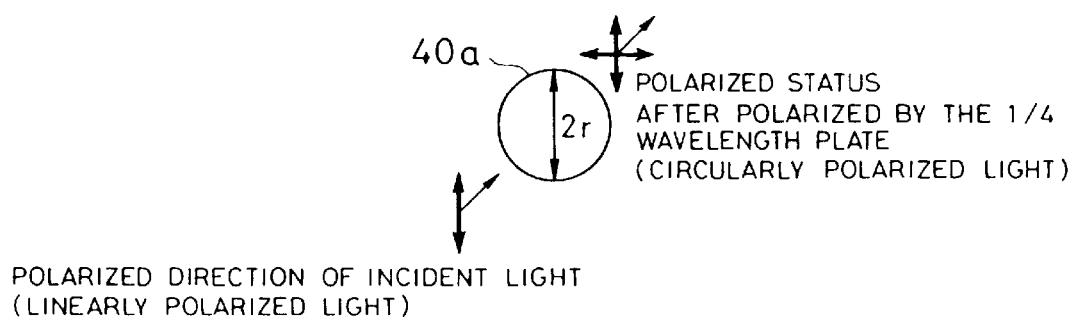

In another optical system for an optical pickup device, as shown in FIGS. 14A and 14B, a ¼ wavelength plate 40a (FIG. 14C) is inserted before the crystal optic lens instead of the polarizing plate 40 shown in FIG. 13C. This embodiment achieves an optical system for an optical pickup device used for the CD/SD compatible video optical disc player similarly to the above embodiments.

In this way, it is necessary that the numerical aperture restricting means is selected from both the annular polarizing plate 40 disposed in the optical axis of the incident ray and having an opening whose area is less than an area of a transverse cross section of the incident light beam in a wavefront direction of the incident light beam, and a ¼ wavelength plate 40a whose area is less than an area of a transverse cross section of the incident light beam in a wavefront direction of the incident light beam under the conditions that the normal line of the principal plane of the crystal optic lens coincides to the optical axis of an incident ray.

(Concrete Examples)

Figure 12B:
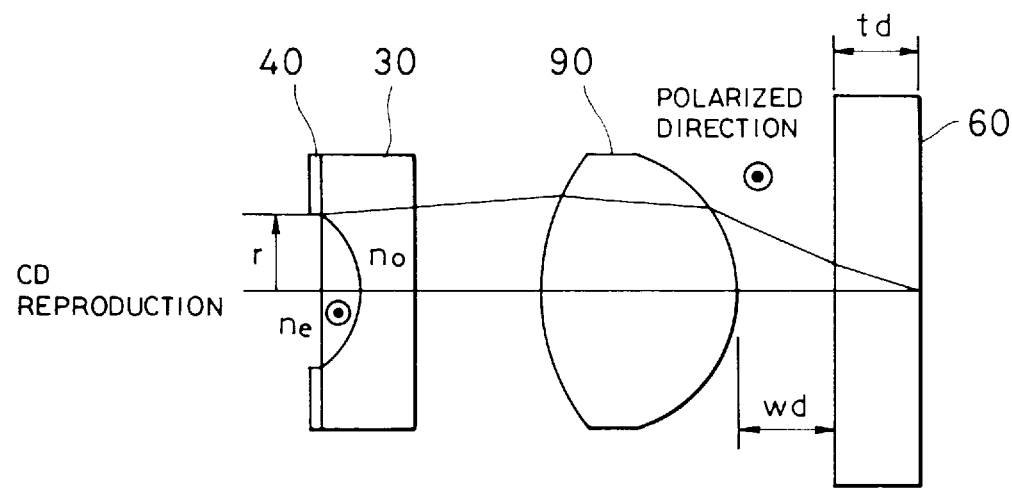

A crystal optic lens was formed. The birefringence medium of quartz ($n_o$=1.542, $n_e$=1.551) (wavelength 650 nm) was used for a first lens body and the optical glass of BALF8 (n=1.551259) available from SCHOTT Co., Ltd. was used for a second lens body. The curved interface was formed in a spherical surface shape. A range of the maximum optical disc thickness td was measured to examine a range for allowable OPD (rms) for the readable optical disc. The following Table 2 shows the result. The optical disc thickness td is shown in FIGS. 12A and 12B.

TABLE 2

| td (mm) | OPD (rms) |
|---|---|
| 0.70 | 0.008047 |
| 0.80 | 0.020261 |
| 0.90 | 0.032490 |
| 1.00 | 0.044725 |

TABLE 2-continued

| td (mm) | OPD (rms) |
|---|---|
| 1.10 | 0.056976 |
| 1.20 | 0.069241 |

Another crystal optic lens was formed. The birefringence medium of quartz was used. The curved interface was formed in a spherical surface shape. As a result, a suitable numeral specification designing for the optical disc thickness 1.2 mm was achieved. The following list shows the result.

td=1.2 mm

OPD (rms)=0.001588

A4=0.027401 (the biquadratic aspherical surface coefficient)

Another crystal optic lens was formed. The birefringence medium of $LiNbO_3$ was used. The curved interface was formed in a spherical surface shape. The following Table 3 shows the result.

TABLE 3

| td (mm) | OPD (rms) |
|---|---|
| 1.10 | 0.006338 |
| 1.20 | 0.017308 |

Another crystal optic lens was formed. The birefringence medium of $TiO_2$ was used. The curved interface was formed in a spherical surface shape. As a result, this was a crystal optic lens with a substantially ideal non-aberration for the 1.2 mm thick optical disc.

td=1.2 mm

OPD (rms)=0.002968

According to the present invention, there is obtained a bifocal crystal optic lens made of a uniaxial crystal comprising two surfaces having a same axis, at least one of the two surfaces having a curved surface. By using this crystal optic lens, the incident light beam is separated into two polarized lights i.e., an extraordinary ray and an ordinary ray have the planes of electric vibrations perpendicular to each other so as to form two focal points in the same axis. Therefore, the lens construction is simplified preferably to minimize the size of lens itself, thereby providing a relatively low cost for the manufacture thereof.

There is also obtained a crystal optic lens comprising a first lens body made of a transparent uniaxial crystal; and a second lens body made of a transparent optical material joining with the first lens body via a curved interface. The crystal optic lens can divide preferably the incident light beam into the extraordinary and ordinary rays for achieving two lens actions different from each other. Therefore, the crystal optic lens and the optical element having a durability against deviations of wavelength of the incident light beam source are achieved.

In addition, the optical system for an optical pickup device according to the present invention comprises an objective lens being a bifocal crystal optic lens made of a uniaxial crystal comprising two surfaces having a same axis, at least one of the two surfaces being a spherical surface or an aspherical surface. This optical system for the optical pickup device causes the structure of a compatible video optical disc player for CD and SD to be simplified preferably to minimize the size of lens itself, thereby providing a relatively low cost for the manufacture thereof.

Furthermore, according to the present invention, there is also obtained an optical system for an optical pickup device comprising; a crystal optic lens comprising; a first lens body made of a transparent uniaxial crystal; and a second lens body made of a transparent optical material selected from a second uniaxial crystal and an optical isotropic material, the first and second lens bodies joining via a spherically or aspherically curved interface; and an objective lens aligned with the crystal optic lens in a same optical axis of an incident ray. This optical system for the optical pickup device is capable of making simultaneously two focal points in the same axis, so as to simplify preferably the structure of the compatible video optical disc player for CD and SD to minimize the size thereof, thereby providing a relatively low cost for the manufacture thereof.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. A bifocal crystal optic lens comprising:
   a uniaxial crystal having two surfaces, both surfaces having a common axis, at least one of the two surfaces having a curved surface;
   wherein the common axis is a crystal optic axis parallel to an optical axis of an incident ray.

2. A bifocal crystal optic lens according to claim 1, wherein said curved surface is aspherical.

3. A bifocal crystal optic lens comprising:
   a uniaxial crystal having two surfaces, both surfaces having a common axis, at least one of the two surfaces having a curved surface; and
   an aspherical surface layer formed from an optical isotropic material on at least one of the two surfaces having the common axis.

4. A bifocal crystal optic lens according to claim 3, wherein said curved surface is aspherical.

5. A bifocal crystal optic lens comprising:
   a uniaxial crystal having two surfaces, both surfaces having a common axis, at least one of the two surfaces having a curved surface; and
   an aspherical surface layer formed of an optical anisotropic material on at least one of the two surfaces having the common axis;
   wherein the common axis is a crystal optic axis parallel to an optical axis of an incident light ray.

6. A bifocal crystal optic lens according to claim 5, wherein said curved surface is aspherical.

7. A bifocal crystal optic lens according to claim 5, wherein said optical anisotropic material is a second uniaxial crystal.

8. A bifocal crystal optic lens according to claim 7, wherein said uniaxial crystal and said second uniaxial crystal are a same uniaxial material.

9. A bifocal crystal optic lens according to claim 7, wherein said uniaxial crystal and said second uniaxial crystal are different materials from one another.

10. A bifocal crystal optic lens according to claim 7, wherein the crystal optic axes, of said uniaxial crystal and said second uniaxial crystal intersect one another.

11. A bifocal crystal optic lens according to claim 7, wherein the crystal optic axes of said uniaxial crystal and said second uniaxial crystal are deposited as being a 90 degree angle to one another.

12. A bifocal crystal optic lens according to claim 7, wherein the crystal optic axes of said uniaxial crystal and said second uniaxial crystal are deposited as being a 45 degree angle to one another.

13. A bifocal crystal optic lens comprising:
   a first lens body formed from a uniaxial crystal having two surfaces, both surfaces having a common axis, at least one of the two surfaces having a curved surface;
   a second lens body comprising an aspherical surface layer formed from an optical anisotropic material on at least one of the two surfaces of the first lens body having the same axis;
   wherein one of the first and second lens bodies has a principal plane whose normal line coincides with an optical axis of an incident light ray and, one of the first and second lens bodies has an area of the transverse cross section smaller than the transverse cross section of the incident light ray in a wavefront direction of the incident light ray.

14. A bifocal crystal optic lens according to claim 13, wherein said curved surface is aspherical.

15. A bifocal crystal optic lens according to claim 13, wherein said optical anisotropic material is a second uniaxial crystal.

16. A bifocal crystal optic lens according to claim 15, wherein said uniaxial crystal and said second uniaxial crystal are a same uniaxial material.

17. A bifocal crystal optic lens according to claim 15, wherein said uniaxial crystal and said second uniaxial crystal are different materials from one another.

18. A bifocal crystal optic lens according to claim 15, wherein the crystal optic axes of said uniaxial crystal and said second uniaxial crystal intersect one another.

19. A bifocal crystal optic lens according to claim 15, wherein the crystal optic axes of said uniaxial crystal and said second uniaxial crystal are at a 90 degree angle to one another.

20. A bifocal crystal optic lens according to claim 15, wherein the crystal optic axes of said uniaxial crystal and said second uniaxial crystal are at a 45 degree angle to one another.

21. An optical system for an optical pickup device comprising:
   a crystal optic lens comprising:
      a first lens body formed from a transparent uniaxial crystal; and
      a second lens body formed from a transparent optical material selected from the group consisting of a second uniaxial crystal and an optical isotropic material;
      the first and second lens bodies being joined via a curved interface; and
      an objective lens aligned with the crystal optic lens on a same optical axis of an incident ray;
      wherein one of the first and second lens bodies has a transverse cross section whose area is less than an area of a transverse cross section of the incident light beam in a wavefront direction of the incident light beam.

22. An optical system for an optical pickup device according to claim 21, wherein said curved interface is aspherical.

23. An optical system for an optical pickup device according to claim 21, wherein the curved interface is spherical.

24. An optical system for an optical pickup device comprising:
  a crystal optic lens comprising:
    a first lens body formed from a transparent uniaxial crystal; and
    a second lens body formed from a transparent optical material selected from the group consisting of a second uniaxial crystal and an optical isotropic material;
    the first and second lens bodies being joined via a curved interface;
  an objective lens aligned with the crystal optic lens on a same optical axis of an incident light ray; and
  an annular polarizing plate for restricting a numerical aperture of the crystal optic lens, the plate being disposed at an incident side of the crystal optic lens and in the optical axis of the incident light ray, the plate having an opening with an area less than an area of a transverse cross section of the incident light ray in a wavefront direction of the incident light ray.

25. An optical system for an optical pickup device according to claim 24, wherein said curved interface is aspherical.

26. An optical system for an optical pickup device according to claim 24, wherein the curved interface is spherical.

27. An optical system for an optical pickup device comprising:
  a crystal optic lens comprising:
    a first lens body formed from a transparent uniaxial crystal; and
    a second lens body formed from a transparent optical material selected from the group consisting of a second uniaxial crystal and an optical isotropic material;
    the first and second lens bodies being joined via a curved interface;
  an objective lens aligned with the crystal optic lens in a same optical axis of an incident light ray; and
  a quarter wavelength plate for restricting a numerical aperture of the crystal optic lens disposed at an incident side of the crystal optic lens, the plate having an area less than an area of a transverse cross section of the incident light ray in a wavefront direction of the incident light ray and disposed in the optical axis oft the incident light ray.

28. An optical system for an optical pickup device according to claim 27, wherein said curved interface is aspherical.

29. An optical system for an optical pickup device according to claim 27, wherein the curved surface is spherical.

* * * * *

UNITED STATES PATENT AND TRADEMARK OFFICE
CERTIFICATE OF CORRECTION

PATENT NO. : 5,867,315
DATED : February 2, 1999
INVENTOR(S) : Koike et al.

It is certified that error appears in the above-identified patent and that said Letters Patent is hereby corrected as shown below:

Claim 10, column 15, line 66, after "axes", delete ",".

Claim 27, column 18, line 11, "in" should read --on--.

Claim 27, column 18, line 20, "oft" should read --of--.

Claim 27, column 18, line 24, "surface" should read --interface--.

Signed and Sealed this

Twenty-ninth Day of February, 2000

*Attest:*

Q. TODD DICKINSON

*Attesting Officer*      *Commissioner of Patents and Trademarks*